United States Patent [19]

McMenamin

[11] Patent Number: 5,200,070
[45] Date of Patent: Apr. 6, 1993

[54] BOTTLE WATER FILTER ARRANGEMENT

[76] Inventor: Kevin P. McMenamin, 554 Cedar St., Ramona, Calif. 92065

[21] Appl. No.: 916,484

[22] Filed: Jul. 20, 1992

[51] Int. Cl.⁵ ............... B01D 35/027; B01D 24/12
[52] U.S. Cl. ........................ 210/206; 210/242.1; 210/282; 210/474; 210/209
[58] Field of Search ............... 210/473, 474, 282, 206, 210/199, 202, 242.1, 209

[56] References Cited

U.S. PATENT DOCUMENTS

| | | | |
|---|---|---|---|
| 2,061,119 | 11/1936 | Voigt | 210/474 |
| 2,167,225 | 7/1939 | Van Eweyk | 210/282 |
| 2,335,458 | 11/1943 | Senyal | 210/474 |
| 2,372,340 | 3/1945 | Senyal | 210/474 |
| 2,502,298 | 3/1950 | White | 210/474 |
| 2,761,832 | 9/1956 | Robb et al. | 210/282 |
| 3,536,197 | 10/1970 | Ward | 210/282 |
| 4,094,779 | 6/1978 | Behrman | 210/474 |
| 4,145,291 | 3/1979 | Console et al. | 210/474 |
| 4,181,243 | 1/1980 | Frahm | 210/282 |
| 4,312,754 | 1/1982 | LaFontaine | 210/282 |
| 4,419,235 | 12/1983 | Sway | 210/282 |
| 4,505,727 | 3/1985 | Cullen et al. | 210/282 |
| 4,528,095 | 7/1985 | Byrne | 210/474 |
| 4,749,481 | 6/1988 | Wheatley | 210/282 |
| 4,995,975 | 2/1991 | Jacquot et al. | 210/266 |
| 5,076,922 | 12/1991 | DeAre | 210/474 |
| 5,116,502 | 5/1992 | Ferguson | 210/453 |

Primary Examiner—Stanley S. Silverman
Assistant Examiner—Cynthia L. Nessler
Attorney, Agent, or Firm—Leon Gilden

[57] ABSTRACT

A water cooler is arranged to receive a bottle member in an inverted orientation thereto, with the water cooler having a top well and an associated opening to receive the water bottle. The top wall includes a top wall flange mounting a torroidal collar, with the torroidal collar positioning a filter member within the water cooler, wherein the filter member includes an inner wall and an outer wall with filtration material therebetween. The inner wall includes inner wall apertures cooperative with outer wall apertures directed through a floor of the outer wall, with the inner wall apertures oriented through the inner wall adjacent an upper end of the filter member to maximize filtration of water through an associated filter material. The invention is arranged to further include a flotation container to permit imparting of additives into the water as desired.

3 Claims, 4 Drawing Sheets

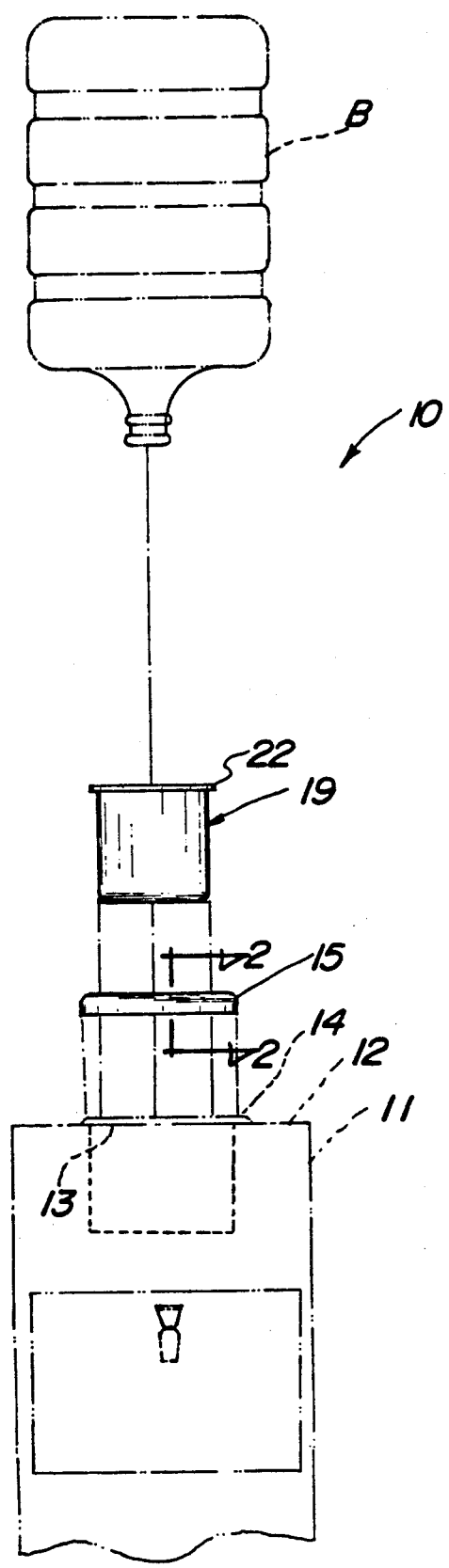

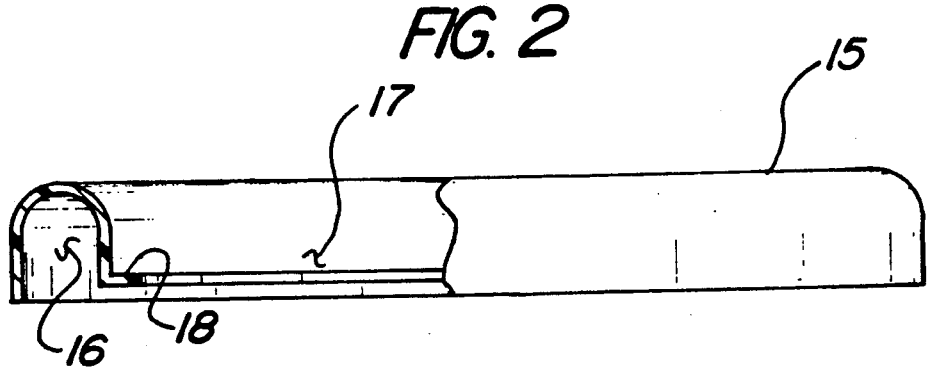
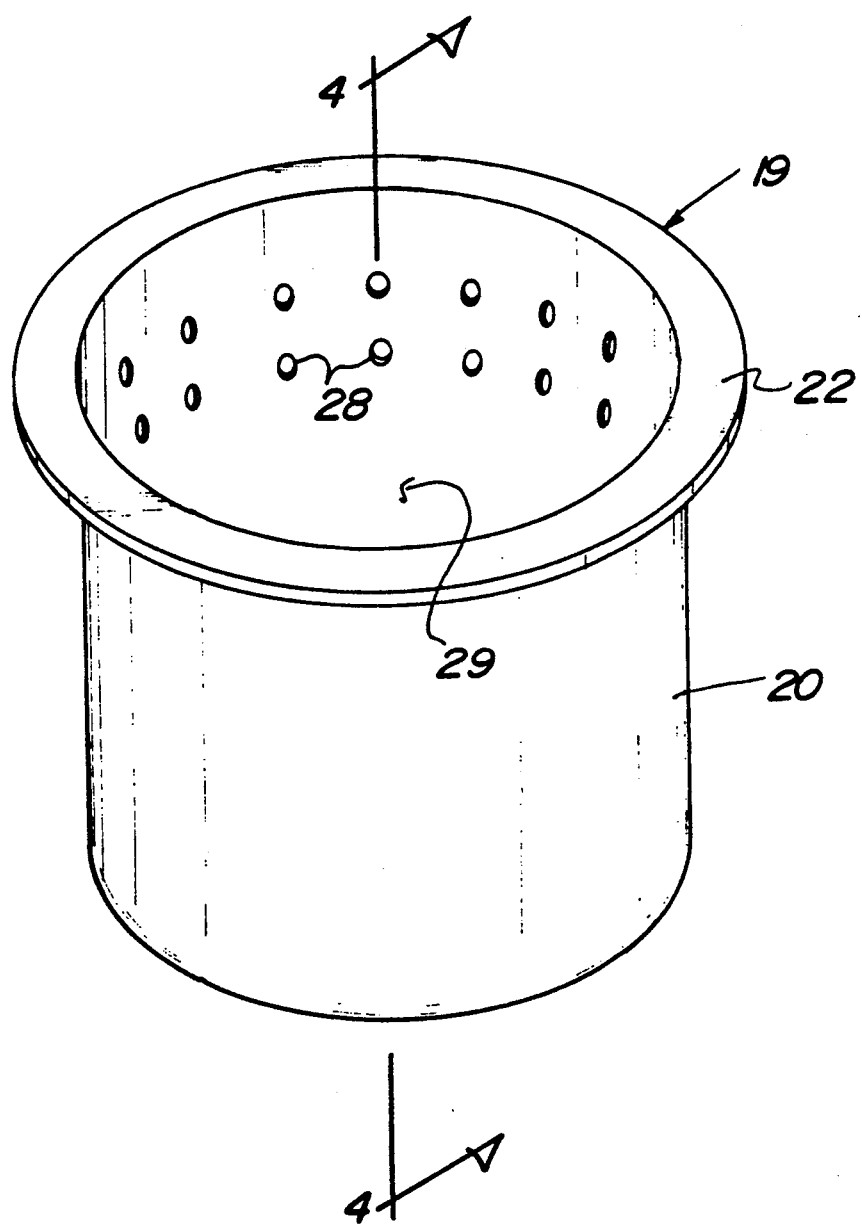

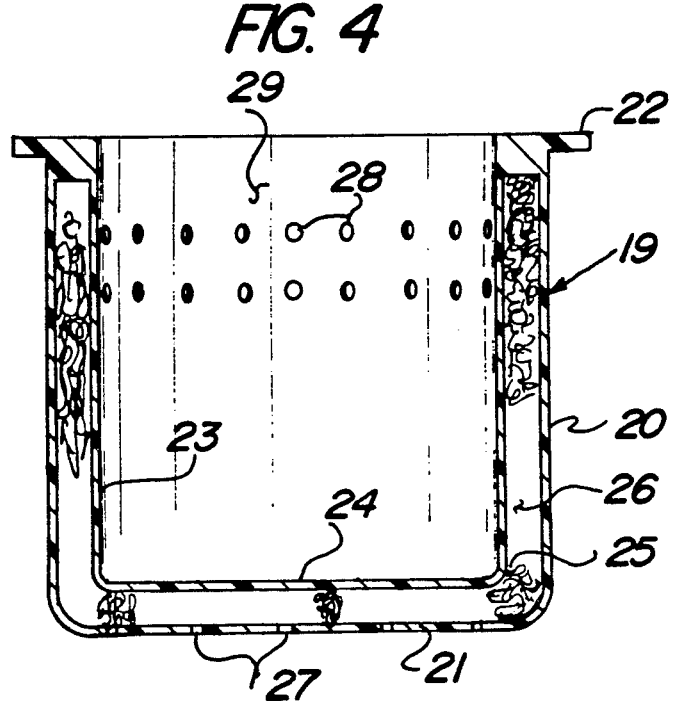
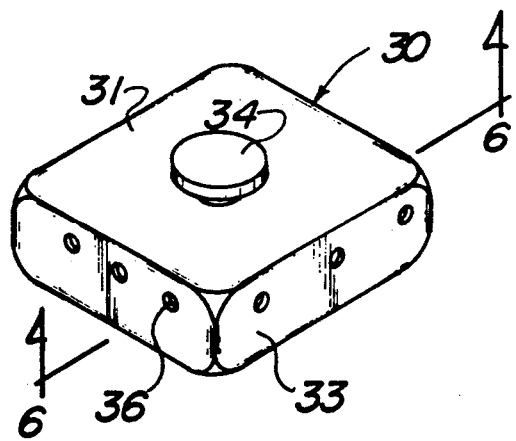
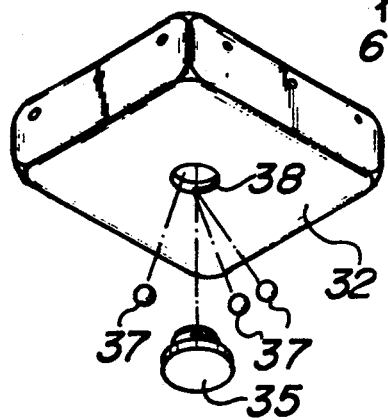

BOTTLE WATER FILTER ARRANGEMENT

BACKGROUND OF THE INVENTION

1. Field of the Invention

The field of invention relates to filtration apparatus, and more particularly pertains to a new and improved bottle water filter arrangement wherein the same is arranged to effect filtering of bottle water within a water cooler.

2. Description of the Prior Art

Filtration structure of various types have been utilized throughout the prior art and filtration of bottled water is indicated in U.S. Pat. No. 4,995,975. Water purifying apparatus of various types are exemplified in U.S. Pat. Nos. 4,902,320; 4,316,802; 4,167,842; and 4,842,723.

Accordingly, it may be appreciated there remains a need for a new and improved bottle water filter arrangement as set forth forth by the instant invention which addresses the problems of ease of use as well as effectiveness in construction and in this respect, the present invention substantially fulfills this need.

SUMMARY OF THE INVENTION

In view of the foregoing disadvantages inherent in the known types of filter apparatus now present in the prior art, the present invention provides a bottle water filter arrangement wherein the same is arranged to filter water from a bottle water source. As such, the general purpose of the present invention, which will be described subsequently in greater detail, is to provide a new and improved bottle water filter arrangement which has all the advantages of the prior art filter apparatus and none of the disadvantages.

To attain this, the present invention provides a water cooler arranged to receive a bottle member in an inverted orientation thereto, with the water cooler having a top wall and an associated opening to receive the water bottle. The top wall includes a top wall flange mounting a torroidal collar, with the torroidal collar positioning a filter member within the water cooler, wherein the filter member includes an inner wall and an outer wall with filtration material therebetween. The inner wall includes inner wall apertures cooperative with outer wall apertures directed through a floor of the outer wall, with the inner wall apertures oriented through the inner wall adjacent an upper end of the filter member to maximize filtration of water through an associated filter material. The invention is arranged to further include a flotation container to permit imparting of additives into the water as desired.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bottle water filter arrangement which has all the advantages of the prior art filter apparatus and none of the disadvantages.

It is another object of the present invention to provide a new and improved bottle water filter arrangement which may be easily and efficiently manufactured and marketed.

It is a further object of the present invention to provide a new and improved bottle water filter arrangement which is of a durable and reliable construction.

An even further object of the present invention is to provide a new and improved bottle water filter arrangement which is susceptible of a low cost of manufacture with regard to both materials and labor, and which accordingly is then susceptible of low prices of sale to the consuming public, thereby making such bottle water filter arrangements economically available to the buying public.

Still yet another object of the present invention is to provide a new and improved bottle water filter arrangement which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of the invention in an assembled orientation.

FIG. 2 is an orthographic view, partially in section, of the collar structure utilized by the invention.

FIG. 3 is an isometric illustration of the filter member utilized by the invention.

FIG. 4 is an orthographic view, taken along the lines 4—4 of FIG. 3 in the direction indicated by the arrows.

FIG. 5 is an isometric top view of the flotation container utilized by the invention.

FIG. 6 is an isometric bottom view of the filtration container utilized by the invention.

DESCRIPTION OF THE PREFERRED EMBODIMENT

Figure 7:
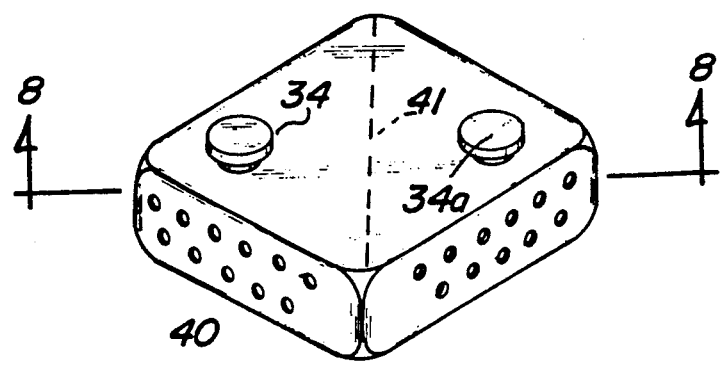
FIG. 7 is an isometric illustration of a modified flotation container utilized by the invention.

With reference now to the drawings, and in particular to FIGS. 1 to 8 thereof, a new and improved bottle water filter arrangement embodying the principles and concepts of the present invention and generally designated by the reference numeral 10 will be described.

More specifically, the bottle water filter arrangement 10 of the instant invention essentially comprises the positioning of a water bottle "B" within a water cooler 11, having a water cooler top wall 12 provided with a top wall opening 13 receiving the water bottle "B" in an inverted orientation, as illustrated in FIG. 1. A top wall annular flange 14 is arranged in surrounding relationship relative to the top wall opening 13. The apparatus of the invention includes a torroidal collar 15 having an annular channel 16 arranged to receive the annular flange 14 to effect its positioning relative to the water cooler top wall 12. A central collar opening 17 receives the water bottle "B" therethrough, as well as the positioning of a filter member 19 onto a collar annular flange 18 directed into the central collar opening 17 of the torroidal collar 15. The filter member 19 includes a cylindrical outer wall 20 having a lower floor 21, with an outer wall flange 22 of annular configuration projecting exteriorly of the outer wall 20 received onto the collar annular flange 18. The filter member 19 is further provided with a cylindrical inner wall 23 spaced interiorly of the cylindrical outer wall 20, with an upper floor 24 spaced above the lower floor 21 to define a wall cavity 26 between the inner and outer wall structure, as well as the upper and lower floor arrangement having filtration medium 25 therewithin. The filtration medium may be of any commercially available type such as indicated in U.S. Pat. No. 4,995,975 incorporated herein by reference, as well as the utilization of gauze material, etc. The lower floor 21 is formed with a matrix of lower floor openings 27 in fluid communication with the filter member's filter central cavity 29 within the filter member 19 above the upper floor 24 within the inner wall 23. The inner wall 23 accordingly is formed with an annular array of inner wall openings 28 in communication with the wall cavity 26 that are positioned in adjacency to the upper end of the inner wall, as well as the filter member 19. In this manner, water from the bottle "B" is directed into a reservoir defined by the filter central cavity 29 and the water thereafter is directed through the inner wall openings 28, through the filtration medium 25, and subsequently through the lower floor openings 27.

Figure 8:
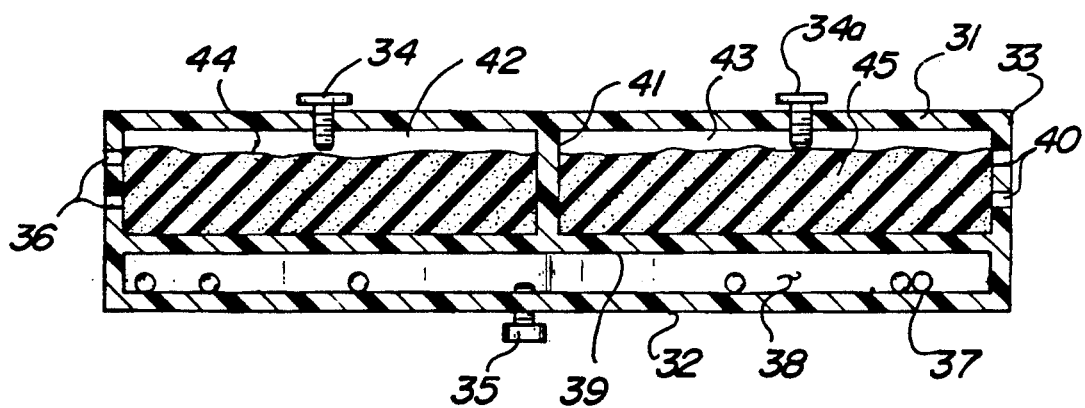
FIG. 8 is an orthographic view, taken along the lines 8—8 of FIG. 7 in the direction indicated by the arrows.

The FIGS. 5-8 indicate the use of a flotation container 30 that is arranged to impart various additives into the water as desired. The flotation container 20 is arranged to effect flotation between a lower end of the bottle "B" and above the upper floor 24 below the inner wall openings 28. The flotation container 30 includes a top wall 31 spaced from a bottom wall 32 having a continuous side wall 33. A top wall cap 34 is in communication with a first upper chamber, wherein the top wall includes a top wall cap 34 removably mounted relative to the top wall opening, wherein the bottom wall cap 35 is mounted to a bottom wall opening, in a manner as illustrated in FIGS. 5 and 6. Side wall apertures 36 effect flow of water into and out of the flotation container 30. An intermediate wall 39 is spaced above the bottom wall 32 and below the top wall 31 in coextensive relationship relative to the top and bottom walls to define a pneumatically sealed chamber to receive ballast weights 37 therewithin to effect maintenance and positioning of the flotation container 30 relative to the filter member 19, and more specifically within the filter central cavity 29. The side wall is arranged to include, if desired and as indicated in the FIG. 7, a second top wall cap 34 directed through a second top wall opening, wherein as illustrated in FIG. 8, arranged for directing additives in a fluid form into a second chamber 43 relative to the first chamber 42 that are divided by a partition wall 41 extending coextensively and orthogonally between the top wall 31 and the intermediate wall 39 and between the side wall 33. To this end, further side wall apertures 40 for communication to the second upper chamber 43, wherein the first sponge member 44 is maintained within the first upper chamber 42 with a second sponge member 45 mounted within the second upper chamber 43. Additives to include nutrients such as vitamins and the like may be provided within one of said chambers 42 or 43, wherein various components such as coloration, flavoring, and the like may be provided within the remaining chamber of the first and second chambers 42 and 43.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bottle water filter arrangement, comprising,
   a water cooler, the water cooler having a water cooler top wall and a top wall opening, and a top wall annular flange mounted to the top wall surrounding the top wall opening, and
   a torroidal collar, the torroidal collar having an annular channel receiving the top wall annular flange, and
   the torroidal collar including a central collar opening sealingly receiving a water bottle therethrough in an inverted orientation, wherein the torroidal collar further includes a collar annular flange directed into the central collar opening, and a filter member, the filter member having a cylindrical outer wall and a lower floor, and the filter member including an outer wall flange mounted to an upper end of the outer wall mounted upon the collar annular flange, and wherein the filter member includes a cylindrical inner wall spaced from the cylindrical outer wall, and an upper floor spaced from the lower floor, and a wall cavity oriented within the filter member between the outer wall and the inner wall and the upper floor and the lower floor, and a filtration medium contained within the wall cavity, and the inner wall including an annular array of inner wall openings directed through the inner wall in communication with the wall cavity, wherein the inner wall openings are positioned adjacent to an upper end of the inner wall, and the lower floor includes a plurality of lower floor openings in communication with the wall cavity, wherein the filter member includes a filter central cavity positioned above the upper floor and between the inner wall to direct fluid from the filter central cavity through the inner wall openings, through the filtration medium, and through the lower floor openings.

2. An arrangement as set forth in claim 1 including a flotation container disposed in the filter central cavity between a lower end of the water bottle and the upper floor of the filter member, the flotation container having a top wall spaced from a bottom wall, and a continuous side wall between the top wall and the bottom wall, and a top wall cap directed through the top wall removably mounted relative to the top wall, and a bottom wall cap removably mounted through the bottom wall, and an intermediate wall spaced parallel to and adjacent the bottom wall within the flotation container having a pneumatically sealed lower chamber, wherein the lower chamber includes ballast weight members contained therewithin, wherein the ballast weight members are arranged for removal through the bottom wall upon removal of the bottom wall cap from the bottom wall, and a plurality of side wall apertures directed through the side wall above the intermediate wall and below the top wall.

3. An arrangement as set forth in claim 2 including a partition wall orthogonally mounted between the top wall and the intermediate wall within the flotation container extending within the flotation member to define a first upper chamber and a second upper chamber between the intermediate wall and the top wall, wherein the side wall apertures are directed in fluid communication with the first upper chamber, and a plurality of further side wall apertures directed through the side wall in communication with the second upper chamber, wherein the first upper chamber includes a first sponge member, and the second upper chamber includes a second sponge member, wherein additives are directed into the first upper chamber and the second upper chamber through the top wall, and a second top wall directed through the top wall in communication with the second upper chamber, wherein the top wall cap is directed to the top wall in communication with the first upper chamber.

* * * * *